United States Patent
Intrater et al.

(10) Patent No.: US 6,961,819 B2
(45) Date of Patent: Nov. 1, 2005

(54) METHOD AND APPARATUS FOR REDIRECTION OF OPERATIONS BETWEEN INTERFACES

(75) Inventors: Gideon D. Intrater, Sunnyvale, CA (US); Anders M. Jagd, Mountain View, CA (US); Ryan C. Kinter, Sunnyvale, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 691 days.

(21) Appl. No.: 10/135,004

(22) Filed: Apr. 26, 2002

(65) Prior Publication Data

US 2003/0204685 A1 Oct. 30, 2003

(51) Int. Cl.[7] .............................................. G06F 12/00
(52) U.S. Cl. ..................................... 711/123; 711/154
(58) Field of Search ........................ 711/123, 125–126, 711/169–170, 210; 712/200, 229; 710/36, 316

(56) References Cited

U.S. PATENT DOCUMENTS

| | | | |
|---|---|---|---|
| 5,574,872 A | * 11/1996 | Rotem et al. ............... | 712/200 |
| 5,638,532 A | 6/1997 | Frame et al. ............... | 711/154 |
| 5,809,530 A | 9/1998 | Samra et al. ............... | 711/140 |
| 5,875,464 A | 2/1999 | Kirk ........................... | 711/129 |
| 6,212,622 B1 | * 4/2001 | Witt ............................ | 712/216 |
| 6,212,623 B1 | * 4/2001 | Witt ............................ | 712/216 |
| 6,308,259 B1 | * 10/2001 | Witt ............................ | 712/214 |
| 6,314,500 B1 | 11/2001 | Rose ........................... | 711/148 |
| 2002/0171652 A1 | 11/2002 | Perego | |

* cited by examiner

Primary Examiner—Denise Tran
(74) Attorney, Agent, or Firm—James W. Huffman

(57) ABSTRACT

A method and apparatus within a processing system is provided for separating access to an instruction memory and a data memory to allow concurrent access by different pipeline stages within the processing system to both the instruction memory and the data memory. An instruction memory interface is provided to access the instruction memory. A data memory interface is provided to access the data memory. Redirection logic is provided to determine whether an access by the data memory interface should be directed to the instruction memory interface utilizing either the address of the access, or the type of instruction that is executing.

45 Claims, 7 Drawing Sheets

METHOD AND APPARATUS FOR REDIRECTION OF OPERATIONS BETWEEN INTERFACES

FIELD OF THE INVENTION

This invention relates in general to the field of computer architecture, and more specifically to a method and apparatus for forwarding instruction transactions from a data interface to an instruction interface within a split interface environment.

BACKGROUND OF THE INVENTION

The present invention is directed to solving the problem of allowing access to instruction memory from a data portion of a pipelined processing system within a split memory architecture. However, to better understand the solution, it is considered important to provide a brief background of a pipelined processing system, and to illustrate the need for a split memory architecture.

Referring to FIG. 1, a block diagram 100 is shown to illustrate instruction flow within a five stage pipelined microprocessor 102. The microprocessor includes: 1) an instruction fetch stage 104 for fetching instructions from memory for execution; 2) a read from register file stage 106, for examining operands within a register file that are specified by the executing instruction; 3) an ALU stage 108, for mathematically, or logically operating upon the operands read from the register file, as specified by the executing instruction; 4) a memory stage 110, to perform loads or stores from/to memory that is external to the microprocessor, such as when an instruction requires that the result of the ALU operation in the ALU stage 108 be stored in memory; and 5) a write back stage 112 to write the result, either from a load in the MEM stage 110, or from an operation in the ALU stage 108, into the register file.

In operation, a first instruction is fetched by the fetch stage 104 for execution during a first clock cycle. During a second clock cycle, the first instruction proceeds to the register file stage 106, and a second instruction is fetched into the fetch stage 104. During a third clock cycle, the first instruction proceeds to the ALU stage 108, the second instruction proceeds to the register file stage 106, and a third instruction is fetched into the fetch stage 104. Thus, at any one time, a five stage processor, such as the one shown in FIG. 1 may have up to five different instructions executing concurrently, each in their own stage within the processor. One skilled in the art will appreciate that modern pipelined microprocessors may have many stages (some have up to 18 stages), each stage executing a different instruction.

So, not only do modern processors execute different instructions at the same time, such as shown in FIG. 1, but often, various stages within modern processors may require access to the same external resources at the same time. Resources that are used by both the fetch stage 104 and the MEM stage 110 include external memory, as well as split instruction and data cache memories. This is particularly illustrated with reference to FIG. 2.

In FIG. 2, a block diagram is shown of a five stage microprocessor 202 such as the one described above with reference to FIG. 1. The microprocessor 202 has five operational stages including a fetch stage 220 and a MEM stage 222 each which requires access to external memory. Access to the external memory is provided via a bus interface unit 224 which is coupled to instruction memory 232 and data memory 234 via an external interface. Whether or not the instruction memory 232 and data memory 234 are separate or unified is irrelevant to this illustration. What is important is that the access to either or both of these memories 232, 234 is through a unified bus interface 224.

The bus interface 224, though it is coupled to both the fetch stage 220 and the MEM stage 222, is only capable of handling a single access request at a time. This does not create a problem if the MEM stage 222 does not require access to the memory 234 at the same time the fetch stage 220 requires access to the memory 232, or vice versa. However, if the fetch stage 220 requires access to the instruction memory 232, to obtain another instruction, at the same time the MEM stage 222 requires access to the data memory 234 (e.g., for a data read/write), then one of the stages will be required to wait while the bus interface unit 224 services the other stage.

It should be appreciated at this point that causing either of the stages within a pipelined processing system to wait, or stall, is not desirable. This is because any delay in one stage of a pipeline affects all the other stages preceding it, and therefore adds to the time it takes for an instruction to execute. This cannot be remedied by simply causing the fetch stage 220 to wait, because the instructions following the fetch stage will continue to execute, thereby creating holes in between the next fetched instruction, and the instructions that preceded it. This is also not desirable.

Therefore, what is needed is a mechanism that allows a number of stages within a pipelined processing system to access memory at the same time.

Moreover, what is needed is a method and apparatus that not only allows concurrent access to memory by different pipeline stages, but one that redirects access from one type of memory to the other as needed.

Furthermore what is needed is a method and apparatus that redirects memory access from a data memory to an instruction memory based on the address of the access requested, and/or based on the type of instruction that is executing.

In addition, what is needed is a redirection method and apparatus for a split instruction/data memory architecture that has an open design, thereby allowing designers of the split/instruction data memory architecture to define for themselves how the memory distinction is made, while simplifying the redirection interface with existing processor side split architecture interfaces.

SUMMARY

The present invention provides a method and apparatus for providing a split instruction/data bus interface to allow concurrent access to instruction and data memories while redirecting data accesses to the instruction memory using the address of the access or the type of instruction that is executing.

In one aspect, the present invention provides a memory interface that includes an instruction memory interface, a data memory interface and a redirect signal. The instruction memory interface performs instruction retrieval from an instruction memory. The data memory interface is coupled to the instruction memory interface, and performs data retrieval from a data memory. The redirect signal is received by the data memory interface when a data retrieval operation is requested by the data memory interface, but the data retrieval operation requests data within the instruction memory. When notice of receipt of the redirect signal is transmitted from the data memory interface to the instruction memory interface, this causes the instruction memory interface to perform the data retrieval operation on the instruction memory.

In another aspect the present invention provides a bus interface within a pipelined processing system, the processing system having at least first and second pipeline stages, the bus interface allowing concurrent retrieval of an instruction from an instruction memory, and data from a data memory. The bus interface includes a first memory interface coupled to the first stage of the processing system, to retrieve the instruction from the instruction memory. The second memory interface is coupled to the second stage of the processing system, to retrieve the data from the data memory. The redirection logic is coupled to the data memory, for determining when the second memory interface requests data from the data memory that does not reside within the data memory, but instead resides within the instruction memory.

In yet another aspect the present invention provides a method for redirecting a memory request from a data memory interface to an instruction memory interface. The method includes: determining whether a request by a data memory interface corresponds to data residing within a data memory or an instruction memory; if the determining determines that the request by the data memory interface corresponds to data residing within the instruction memory, redirecting the request to an instruction memory interface.

In a further aspect, the present invention provides a computer program product for use with a computing device, the computer program product including a computer usable medium, having computer readable program code embodied in the medium, for causing a processing system to be described. The computer readable program code includes first program code for providing an instruction memory interface for reading instructions from an instruction memory; second program code for providing a data memory interface for reading data from a data memory; and third program code for providing redirection control coupled to said data memory interface. The redirection control determines whether data requested by the data memory interface resides within the instruction memory; and if the redirection control determines that the data requested by the data memory interface resides within the instruction memory, the redirection control causes the data memory interface to direct the instruction memory interface to request the data from the instruction memory.

In a further aspect, the present invention provides a computer data signal embodied in a transmission medium. The computer data signal includes computer-readable program code for providing a split instruction/data bus interface for concurrently retrieving instructions from an instruction memory, and data from a data memory. The program code includes: first program code for providing an instruction bus interface for retrieving instructions from the instruction memory; second program code for providing a data bus interface for retrieving data from the data memory; and third program code for providing logic to determine whether data requested by the data bus interface resides within the instruction memory; and fourth program code for generating a signal from the logic to cause the instruction bus interface to retrieve the data from the instruction memory.

In another aspect, the present invention provides a processing system having a processor with a plurality of processing stages, at least two of the processing stages for communicating with associated first and second memories. The processing system includes a first memory interface, a second memory interface and redirection logic. The first memory interface communicates between a first one of the at least two processing stages and the first memory. The second memory interface is coupled to the first memory interface, to communicate between a second one of the at least two processing stages and the second memory. The redirection logic is coupled to the second memory interface, to direct the first memory interface to communicate with the first memory on behalf of the second one of the at least two processing stages.

Other features and advantages of the present invention will become apparent upon study of the remaining portions of the specification and drawings.

DETAILED DESCRIPTION

Figure 3:
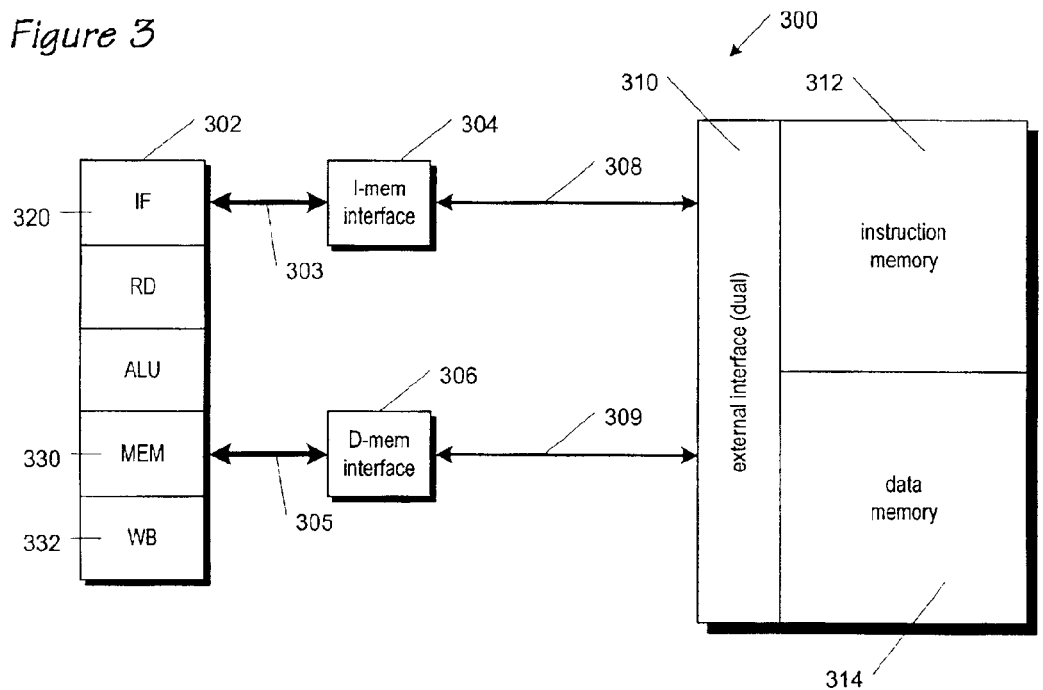
FIG. 3 is a block diagram of a pipelined processing system coupled to separate instruction and data memories via a split bus interface according to the present invention.

Referring now to FIG. 3, a block diagram 300 is shown of a pipelined processing system 302 coupled to an instruction memory interface 304 via an instruction bus 303, and to a data memory interface 306 via a data bus 305. The instruction memory interface is coupled to an external interface 310 via interface bus 308. The data memory interface 306 is coupled to the external interface 310 via interface bus 309. The external interface 310 provides connection between the internal memory interface 304 and an instruction memory 312, and between the data memory interface 306 and data memory 314.

In operation, when a fetch stage (IF) 320 of the processing system 302 requires another instruction, it provides the address of the instruction to the instruction memory interface 304 via bus 303. The instruction memory interface 304 in turn presents the request to the instruction memory 312 via the external interface 310. The external interface 310 retrieves the requested data from the instruction memory 312 and provides it to the instruction memory interface 304 via bus 308. The instruction memory interface 304 then provides the requested instruction to the fetch stage 320 via bus 303. The fetch stage 320 then executes the retrieved instruction in the following stages of the processing system 302.

Similarly, when a MEM stage 330 of the processing system 302 requires data to be read from, or written to the data memory 314, an access request is presented by the MEM stage 330 to the data memory interface 306 via bus 305. The data memory interface 306 in turn presents the request to the data memory 314 through the external interface 310 via bus 309. The external interface 310 either writes the data into the data memory 314, or reads the data from the data memory 314, depending on whether the operation is a write or a read. If the operation is a write, upon completion of the write, the external interface 310 indicates completion of the write to the data memory interface 306 via bus 309. If the operation is a read, the external interface 310 provides the requested data to the data memory interface 306 via bus 309. The data memory interface then provides the requested data to the MEM stage 330 of the processing system 302. The read data is then written into the register file (not shown) within the processing system 302 during a write back (WB) stage 332 of the processing system 302.

One skilled in the art will appreciate that the term "external" when referring to the external interface 310 merely represents that the external interface 310 is coupled to the processing systems interfaces 304, 306 via address/data/control buses, rather than being integral, but does not imply anything regarding the location of the external interface 310. That is, it may all be on the same silicon, such as in a system-on-chip design.

Figure 1:
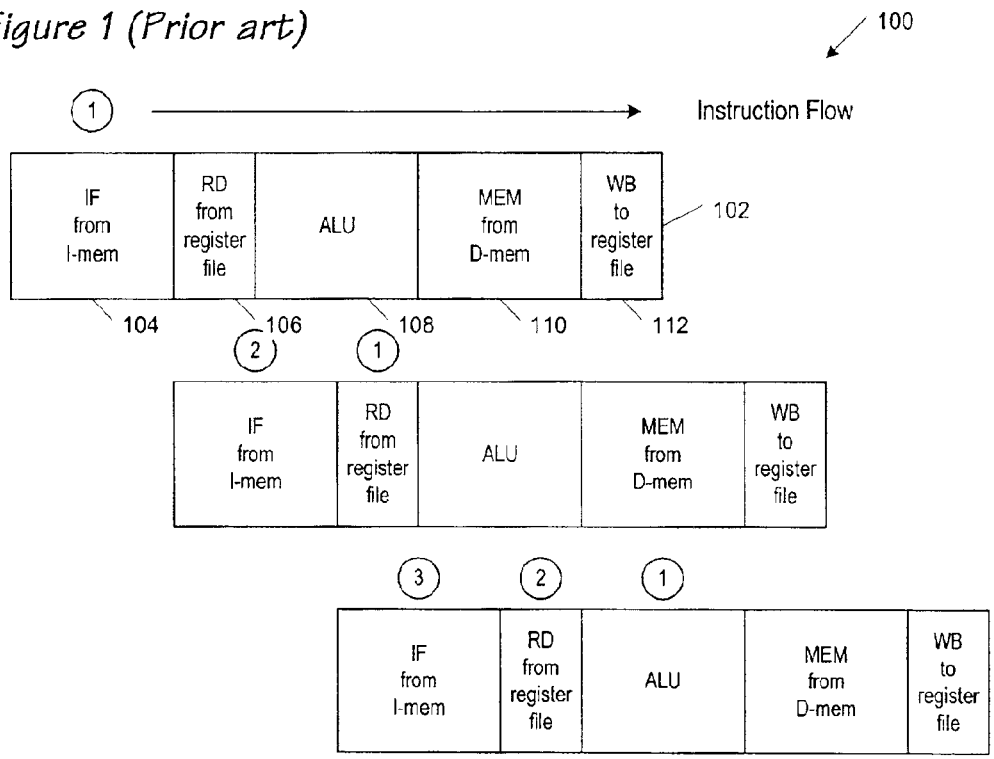
FIG. 1 is a block diagram of a prior art five stage pipelined processing system
Figure 2:
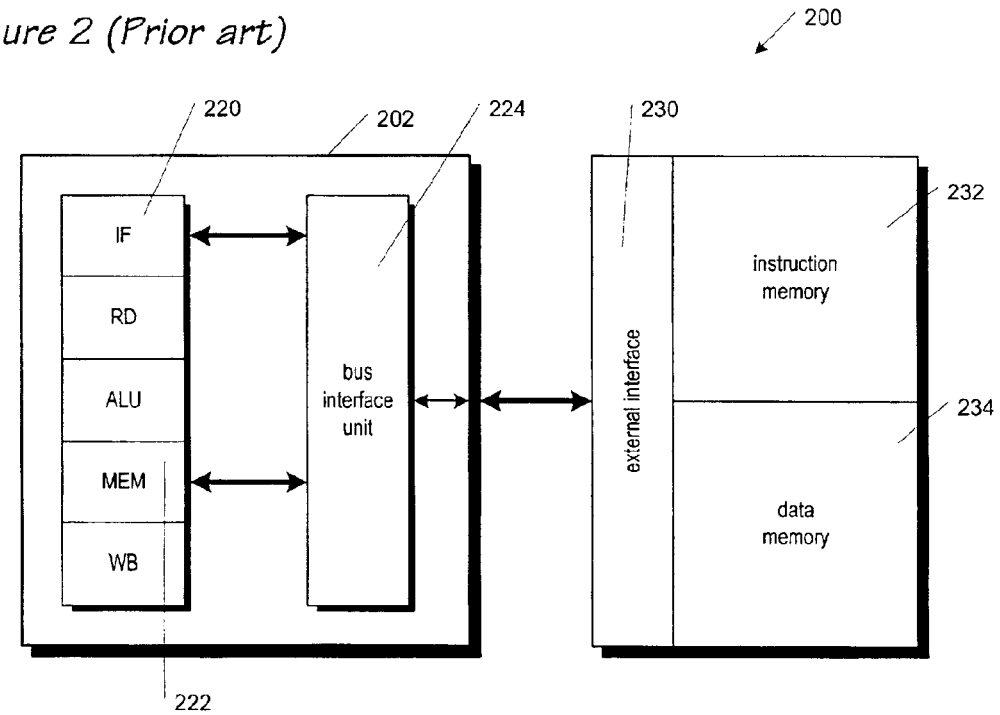
FIG. 2 is a block diagram of the prior art processing system of FIG. 1 coupled to separate instruction and data memories via a unified interface.
Figure 4:
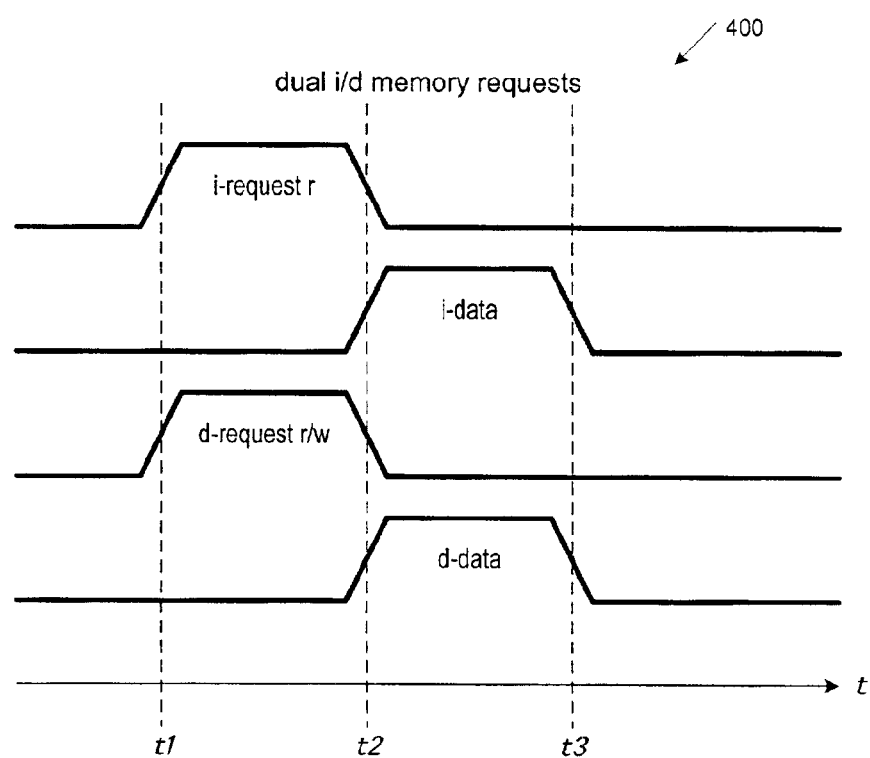
FIG. 4 is a timing diagram illustrating concurrent access to the separate instruction and data memories shown in FIG. 3.

Referring now to FIG. 4, a timing diagram 400 is shown illustrating concurrent access to both the instruction memory 312 and the data memory 314 by the processing system 302. At some time before t1, two requests are presented by the processing system 302. The first request is a request by the fetch stage 320 to the instruction memory interface 304 to read data from the instruction memory 312. The second request is a request by the MEM stage 330 to read/write data from/to the data memory 314. At time t1, both of these requests are posted by the instruction memory interface 304 and the data memory interface 306 to the external interface 310 via buses 308, 309 respectively. At time t2, the external interface 310 provides the read instruction from the instruction memory 312 to the instruction memory interface 304, and provides the read data from the data memory 314 to the data memory interface 306. Thus, by the time t3 occurs, both the fetch stage 320 and the MEM stage 330 have had their requested operations performed. One skilled in the art will appreciate that by allowing concurrent access by the fetch stage 320 to the instruction memory 312, and by the MEM stage 330 to the data memory 314, the processing system 302 has not had to delay processing such as was required in the prior art system of FIG. 2 described above.

Figure 5:
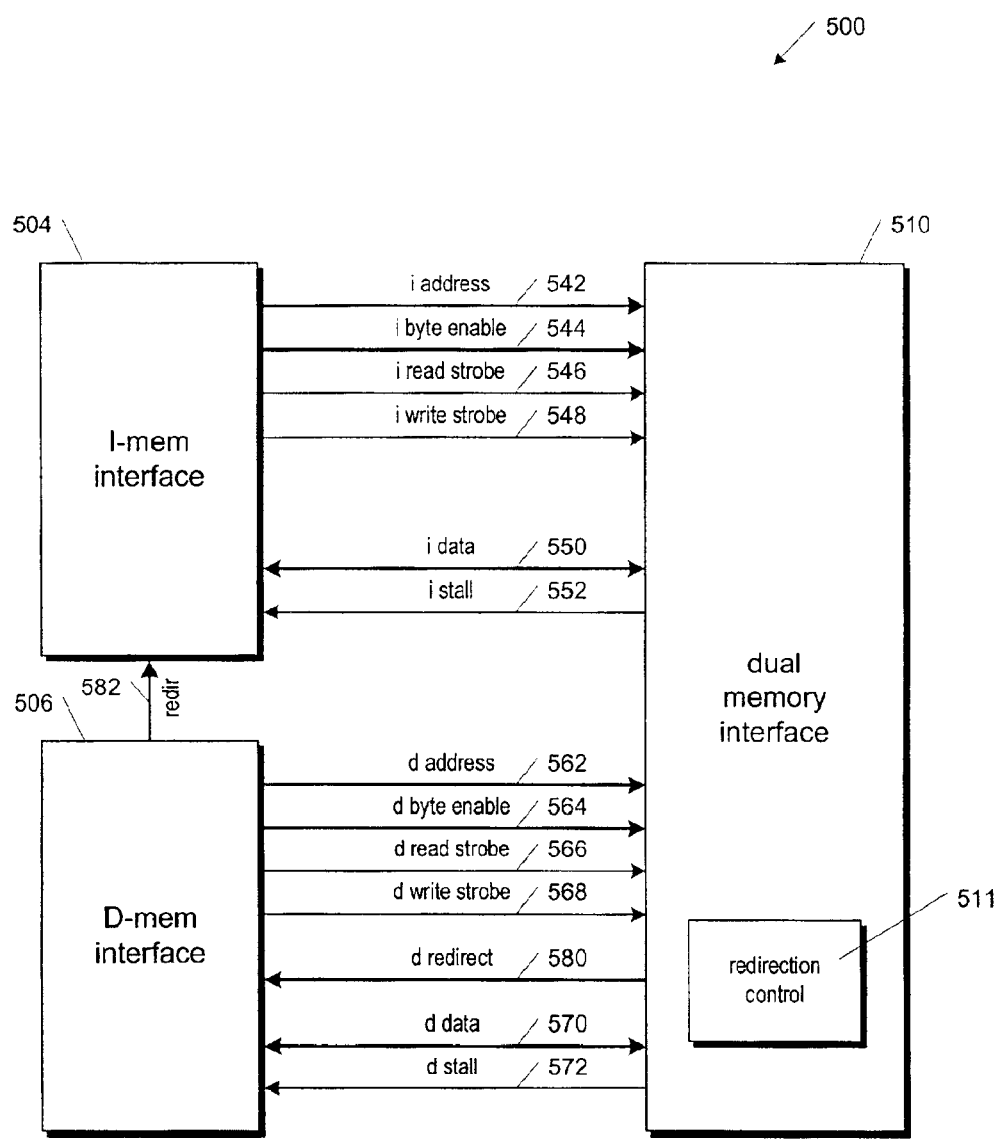
FIG. 5 is a block diagram further illustrating the signal connections between the split instruction/data interface of the present invention and the dual interface coupled to the separate instruction and data memories.

Referring now to FIG. 5, a block diagram 500 is provided that illustrates the signal lines between an instruction memory interface 504, a data memory interface 506 and a dual memory interface 510. Although not shown, it should be understood that the instruction memory interface 504 is coupled to an instruction fetch stage of a processing system. In addition, the data memory interface 506 is coupled to a data fetch (or memory access) stage of the processing system. And, the dual memory interface 510 is coupled to separate instruction and data memories such as those shown in FIG. 3.

More specifically, the instruction memory interface 504 contains four address/control buses that couple it with the dual memory interface. These include: 1) an instruction address bus 542 for transmitting to the dual memory interface 510 the memory address of the instruction to be fetched from the instruction memory; 2) an instruction byte enable bus 544 for indicating which byte lanes are to be accessed, as will be further described below; 3) an instruction read strobe 546 to indicate to the dual memory interface that an operation is an instruction (or data) read from the instruction memory; and 4) an instruction write strobe 548 for indicating to the dual memory interface 510 that a data write operation is requested to the instruction memory (for redirected writes as will be further described below).

The instruction memory interface also contains an instruction data bus 550 for transferring read instructions/data from the instruction memory to the instruction memory interface 504, and for transferring data writes from the instruction memory interface 504 to the instruction memory. One skilled in the art will appreciate that the instruction data bus 550 may be split into two busses, one for read data, and one for write data. A fifth signal line, called an instruction stall signal 552 is provided to allow the dual memory interface 510 to signal the instruction memory interface 504 that a requested read/write from/to the instruction memory cannot be completed in a single cycle, and must therefore stall the processing read/write until the instruction stall signal 552 is de-asserted.

Similarly, the data memory interface contains a data address bus 562, a data byte enable bus 564, a data read strobe 566, a data write strobe 568, a data bus 570 and a data stall 572. Operation of each of these signal lines is similar to those described above with respect to the instruction memory interface 504. In addition, as mentioned above, the data bus 570 may be split into two busses, one for read data, and one for write data. Furthermore, in some applications it may be advantageous for the write side of the instruction and data busses 550, 570 to utilize a common bus.

In addition, the data memory interface 506 is capable of receiving a data redirect signal 580 from the dual memory interface 510, generated by a redirection control 511 within the dual memory interface. Operation of the redirection control 511 and the redirect signal 580 will be further described below with reference to FIGS. 6–9. When the data memory interface 506 receives a redirect signal 580 from the dual memory interface 510, notice of receipt of the signal is provided from the data memory interface 506 to the instruction memory interface 504 via redir signal line 582.

Before detailing the operation of the redirection control 511, the redirect signal 580 and the redir signal 582, a brief overview of the need for redirection of data access is considered appropriate. In the Background above, a problem resulting from a unified memory structure was described. That is, within a unified memory structure, when two different pipeline stages of a processing system required concurrent access to the unified memory, one of the pipeline stages was required to wait while the other accessed the unified memory. To overcome this delay, split instruction and data memories such as those described in FIGS. 3 and 4 are provided to allow an instruction fetch stage to access an instruction memory while a data stage accesses a data memory. Such a split memory provides a significant advantage in that neither the instruction stage nor the data stage of a pipelined processing system are required to wait on the access of the other, but instead can concurrently access their own memory space.

However, it has been observed by the inventors of the present invention that it is often desirable to place instructions/data that is used by the data MEM stage of a pipelined processing system within the address space allocated to the instruction memory. One skilled in the art will appreciate that this is desirable in such instances as when using self modifying code, when instructions are to be loaded from the data space into the instruction space (e.g., such as when loading an application), or when operations execute which load data into the register file that is located in memory relative to instruction program counter. In each of these instances, a data access operation is required, placing the contents of the retrieval into the data stage of the processing system. However, the data retrieval is to the address space of the instruction memory. In a unified memory architecture such as that described in the Background, no problem is created since the interface treats the instruction and data memory the same. But, in taking advantage of the split instruction/data memory as described above with respect to the present invention, if a programmer is to be allowed to place "data" to be operated upon within the instruction space of the instruction memory, there is a need to redirect such accesses from the data memory interface 506 to the instruction memory interface 504. The method and apparatus for implementing such a redirection will now be described with reference to FIGS. 5–9.

Figure 6:
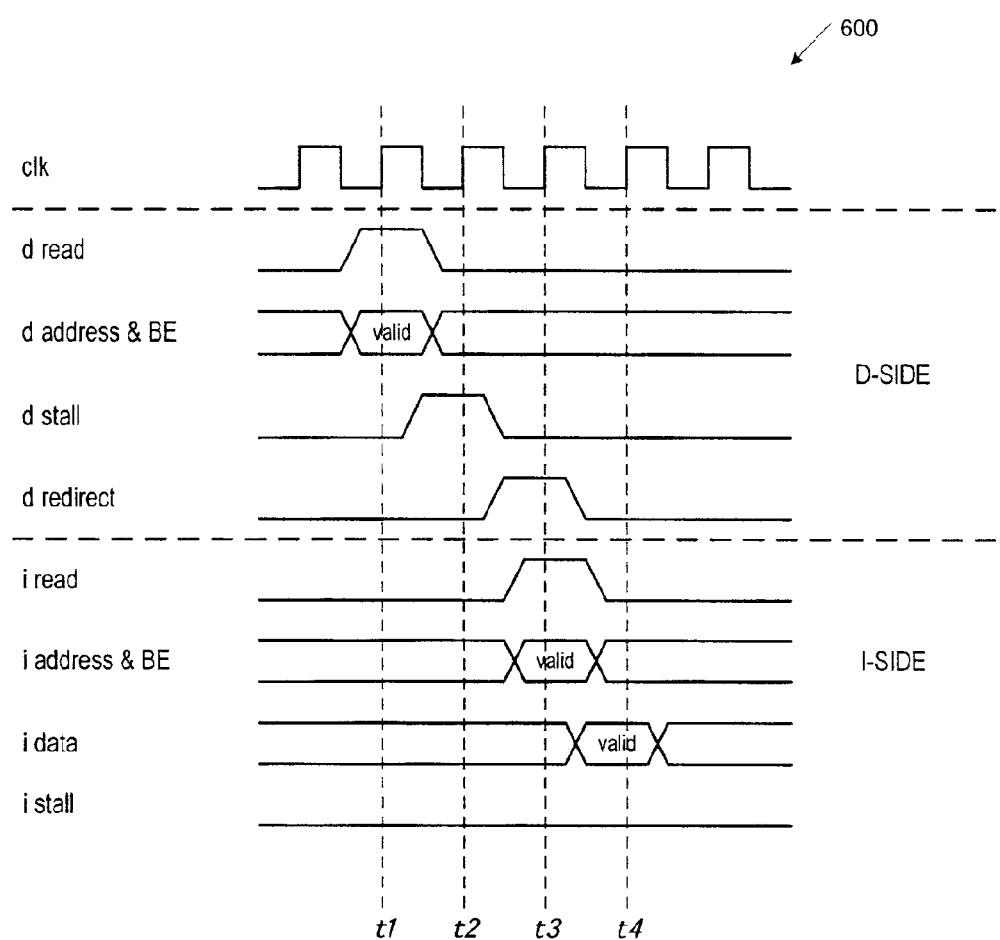
FIG. 6 is a timing diagram illustrating redirection of a data access by the data interface to the instruction interface.

Referring to FIGS. 5 and 6 collectively, FIG. 6 provides a timing diagram 600 illustrating signal transitions on the signal lines 542–572 described above during a redirect operation. It should be appreciated that the timing diagram 600 represents one embodiment of the invention, but other embodiments are possible. For example, the inventors also envision providing a one clock cycle delay between receipt of the redirect signal and the redirected access.

At time t1, the data memory interface 506 begins a data read operation (as required by a data MEM stage of the processing system). An example of such a request would be a load from memory operation. The data memory interface 506 asserts the data read strobe 566, and places the memory address for the read on the data address bus 562.

At time t2, the dual memory interface has received the data read strobe 566 and has examined the address on the data address bus 562. However, rather than providing the data from the data memory, the dual memory interface 510 has examined the address presented by the data address bus 562, and has determined that the data at that address cannot be provided by the data memory, at least during the present bus cycle. A data stall signal 572 is therefore provided to the data memory interface 506 to indicate that the interface 506 should not expect the requested data to be provided during the present cycle. Use of the data stall signal 572 is not particularly relevant to redirection, but rather is used to simply indicate to the requesting bus interface that the request cannot be serviced in the present cycle.

At time t3, the redirection control 511 has determined that the address for the requested data actually resides within the instruction memory. The redirection control 511 therefore asserts a data redirect signal 580 to the data memory interface. Notice of receipt of the data redirect signal 580 is then provided to the instruction memory interface 504, via redir signal 582 along with the address for the requested data. If the instruction memory interface 504 is not completing an instruction fetch during the same cycle, the instruction memory interface 504 immediately asserts an instruction read strobe 546, and uses the address for the data read on the instruction address bus 542. If the instruction memory interface 504 is completing an instruction fetch during the same cycle, the fetch can either be aborted, or allowed to continue to completion before the data fetch is begun.

At time t4, the dual memory interface presents the requested data to the instruction memory interface via the instruction data bus 550. The data retrieved from the instruction memory by the instruction memory interface 504 is then provided to the data memory interface 506 as will be further described below.

What should be apparent, at this point, is that loads and stores by the data memory interface 506 to an address within the address space of the instruction memory are allowed by providing redirection control 511 within the dual memory interface 510. The redirection control 511 examines the address of reads/writes to data memory, and if the address is within the address space of the instruction memory, it generates a signal to the data memory interface that redirects the reads/writes to the instruction memory interface 504 for execution. Thus, reads/writes to instruction memory space have been provided for within the context of a split instruction/data memory architecture.

Figure 7:
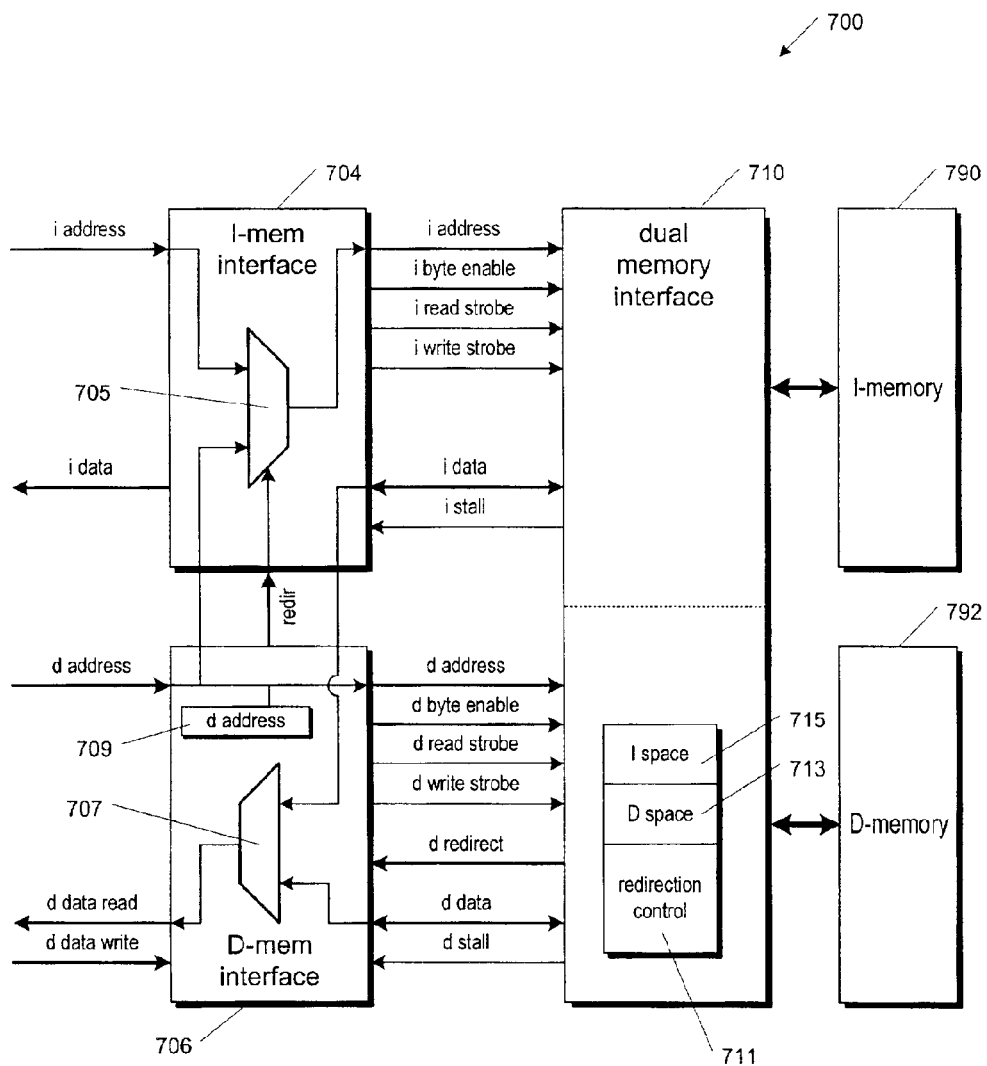
FIG. 7 is a block diagram illustrating one embodiment of redirecting data accesses to the instruction interface according to the present invention.

Referring now to FIG. 7, a block diagram 700 is shown of one embodiment of the redirection mechanism of the present invention. The block diagram 700 contains like elements with FIG. 5, referenced with the same number, the hundreds digit being replaced with a 7. In addition, the instruction memory interface contains redirection logic 705 for selecting as an address to be used for a read/write either the instruction address provided by the fetch stage of the processing system (e.g., the value in the instruction program counter), or if a redirection is requested, the data address of the data requested to be read/written by the MEM stage of the processing system. One skilled in the art will appreciate that different types of logic can be utilized to implement such a selection, but for purposes of illustration, a mux 705 has been shown. It should also be appreciated that the size of the mux 705 is appropriate to the size of the address bus 542, whether 32-bits, or bigger or smaller, depending on the needs of the system. Also, in addition to the address for the memory access operation, the redirection logic 705 also selects and passes the byte enables associated with the access. For example, 16-bit instructions may cause 32-bit reads (i.e., all four byte enable bits set), or it may cause 16-bit reads, which again may cause either bits 0–1, or bits 1–2 to be set (depending on the endianness of the data). If however, the access is a data access operation that has been redirected, the byte enable bits that are passed by the redirection logic 705 will pertain to whatever was initially requested by the data memory interface 706. In a 32-bit environment, for example, four byte enable bits are provided to allow the instruction memory interface 704 to designate one or more of four bytes for data operations to the instruction memory.

The data memory interface 706 also contains redirection logic 707 for selecting as data to be provided to the MEM stage of the processing system, either data retrieved from the data memory 792, or data retrieved via redirection from the instruction memory 790. That is, for a load data operation that, in the MEM stage of a processing system, requests data to be loaded from instruction memory, the operation is redirected to the instruction memory interface 704 for access to the instruction memory 790. However, when the data is provided to the instruction memory interface 704, rather than flowing to the instruction fetch stage of the processing system, it flows to the redirection logic 707 within the data memory interface 706, and subsequently to the MEM stage of the processing system that requested the data.

In addition, the data memory interface 706 also includes data address storage 709 for storing the memory address of data that is pending to be read/written, along with byte enable information. Thus, if a data request is redirected, the address can be provided immediately to the instruction memory interface 704, along with notice of the redirection. In one embodiment, the data address storage 709 is a register that is cleared upon completion of each data access. In an alternative embodiment, the storage 709 is a FIFO that accumulates multiple addresses for environments that support multiple reads/writes to memory.

Within the dual memory interface 710 redirection control 711 is provided, along with data space logic 713 and instruction space logic 715. In one embodiment, the data space logic 713 and the instruction space logic 715 are registers that contain values corresponding to the predefined address space of the instruction memory 790 and the data memory 792. The values contained within the instruction space logic 715 and the data space logic 713 can either be a range of address spaces pertaining to each memory 790, 792, or lookup tables of non-sequential memory locations that have been assigned to each of the memories 790, 792. Moreover, the instruction space logic 715 and the data space logic 713 may be pre-programmed by the designer of the dual memory interface 710, or may be programmed by software at run-time. One skilled in the art will appreciate that the dual memory interface 710 may be split into separate I and D side interfaces, as shown by the dashed line within the 710 interface, with each side communicating directly between the I-MEM interface 704 and the I memory 790, and between the D-MEM interface 706 and the D-MEM 792, respectively.

In operation, when a data access request (a read or a write) is presented to the data memory interface 706 from the MEM stage of the processing system, the memory address for the request is stored within the data address storage 709, along with byte enable information, concurrent with presenting the address to the dual memory interface 710. In addition, the type of access (read or write) is presented on the data read or write strobe. The redirection control 711 examines the address presented to determine whether the access is to data memory 792 or instruction memory 790. If the access is to data memory 792, and a write is requested, the data is written into the data memory 792. If the access is to data memory 792, and a read is requested, then the data is retrieved and provided to the data memory interface 706 for provision to the MEM stage of the processing system.

If the redirection control 711 determines, after examining the address of the request, and the contents of the instruction space 715 and the data space 713 that the access request is within the instruction memory 790, then the redirection control provides a data redirect signal to the data memory interface 706. The data memory interface 706 then provides the instruction memory interface 704 with a redir signal, thereby noticing the instruction memory interface 704 that a data access request is to be redirected to the instruction memory 790. This causes the redirection logic 705 to select the access address stored in the data address storage 709 as the address to access the instruction memory 790. This address is provided to the dual memory interface 710 via the instruction address bus, along with the type of access, whether a read or a write, to the dual memory interface 710. If the access is a write, then the data is written to the instruction memory 790 and the access is completed. If the access is a read then the data is read from the instruction memory and passed back to the instruction memory interface 704. The instruction memory interface 704 provides the data to the redirection logic 707 within the data memory interface.

At this point, one skilled in the art will appreciate that data operations to instruction memory 790, whether reads or writes, from a data access stage of the processing system, have been provided for within a split instruction/data memory architecture, by examining access requests based on their address, and redirecting those requests that fall within the instruction memory space. Moreover, the embodiment shown in FIG. 7 allows a designer of the dual memory interface 710 to implement their own strategy regarding how they are going to divide up their instruction memory 790 and data memory 792 according to their needs. All that is necessary is that they provide the data memory interface 706 with a redirection signal, according to their own criteria, and they can trust that the instruction/data interface side of the processing system can handle the redirection when required.

Figure 8:
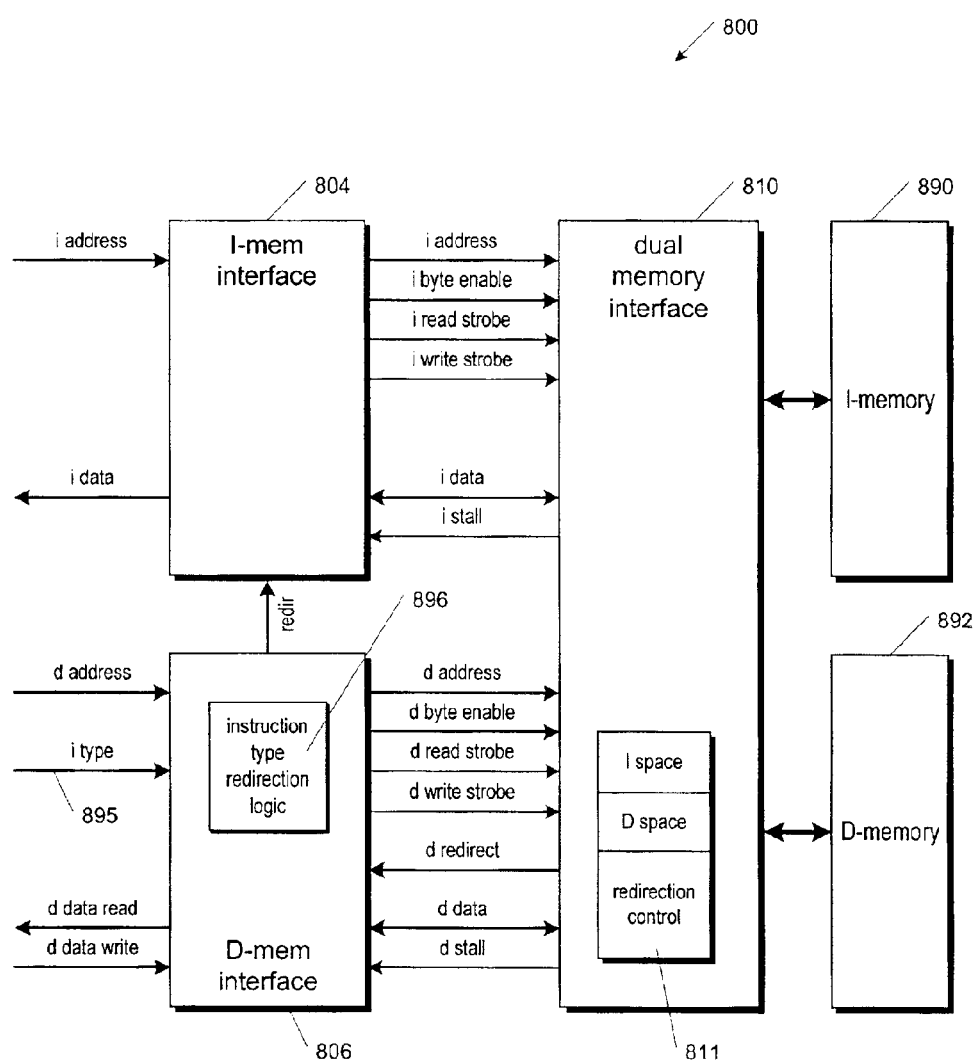
FIG. 8 is a block diagram illustrating an alternative embodiment of redirecting data access to the instruction interface based on the type of instruction that is executing.

Referring now to FIG. 8, a block diagram 800 is shown of an alternative embodiment of the present invention. This embodiment includes instruction type redirection logic 896 within the data memory interface 806. The purpose of the instruction type redirection logic 896 is to detect a set of predefined instructions within the processing system's architecture that are known a priori to utilize the instruction memory of the processing system. For example, within MIPS16e code from MIPS Technologies, Inc., (1225 Charleston Road, Mountain View, Calif. 94043-1353, www.mips.com), constants are typically loaded using a PC (i.e., program counter) relative load instruction called "lwpc" When an instruction such as this reaches the MEM stage of the processing system, and requests the data memory interface 806 to perform a load operation from memory, the instruction type redirection logic 896 determines, using instruction type information provided on the instruction type bus 898, that the instruction, by its very design, is requesting data from the instruction memory 890 rather than from the data memory 892. Therefore, rather than requiring the access to first be presented to the redirection control 811, and later redirected, the instruction type redirection logic 896 intercepts the access request and immediately redirects the request to the instruction memory interface 804. The result is that the access request is never presented to the dual memory interface 810 from the data memory interface 806. Rather, the access is redirected to the instruction memory interface 804 and presented to the dual memory interface 810. Once the data is retrieved from the instruction memory 890 and provided to the instruction memory interface 804, it is redirected back to the data memory interface 806 similar to the method described above with respect to FIG. 7. Thus, by predefining a set of instructions, or an instruction type that will read/write data from/to instruction memory, redirections are provided for in a split instruction/data memory architecture, without requiring use of redirection control 811, and/or without requiring that they first be posted on the data memory interface bus.

Of course, one skilled in the art will appreciate that either of the embodiments described in FIGS. 7 and 8 may be used together, or alone, depending on the needs of the processing system. It should also be appreciated that the instruction type may be determined by using a bit, or set of bits that define the instruction, according to the architecture in which this invention is used.

Figure 9:
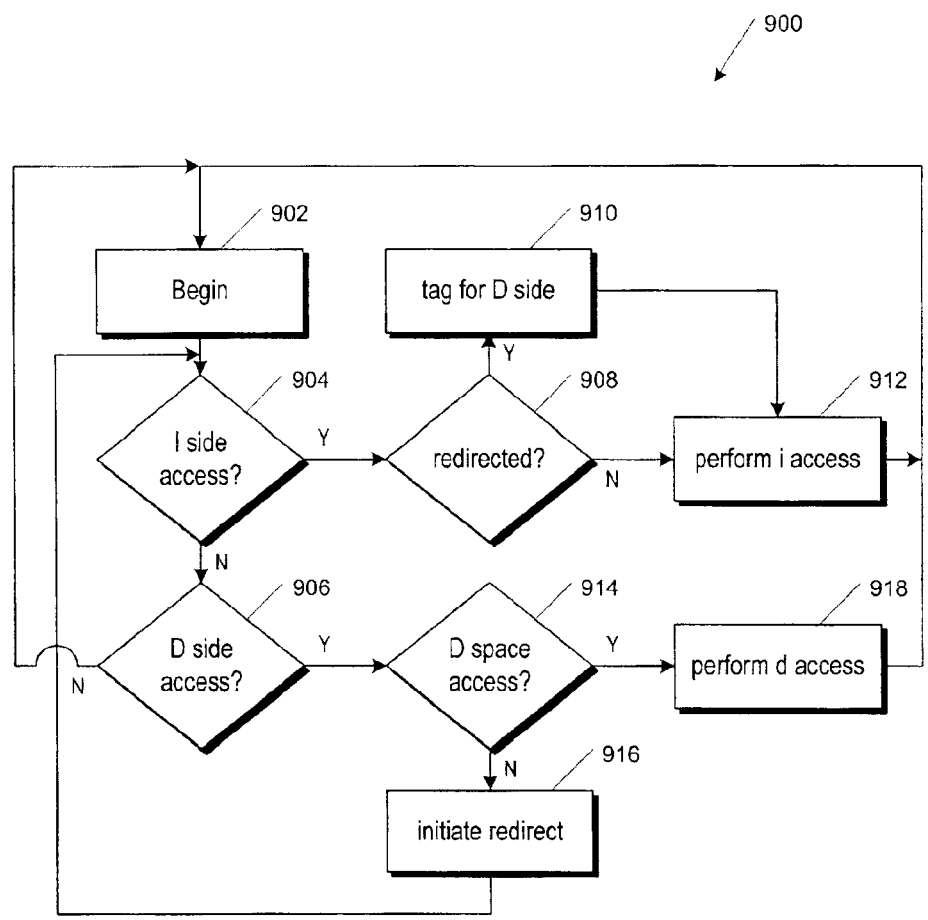
FIG. 9 is a flow chart illustrating the method of redirecting data accesses to the instruction interface according to the present invention.

Referring now to FIG. 9, a flow chart 900 is shown that illustrates the redirection method of the present invention. The method begins at block 902 and proceeds to decision block 904.

At decision block 904 a determination is made as to whether access is being requested from the instruction memory interface. If not, flow proceeds to decision block 906. Otherwise, flow proceeds to decision block 908.

At decision block 906, a determination is made as to whether an access is being requested by the data memory interface. If not, flow proceeds back to block 902 to await the next access. If an access is being requested by the data memory interface, flow proceeds to decision block 914.

At decision block 914 a determination is made as to whether the access is within the data memory space. If it is, flow proceeds to block 918. If not, then flow proceeds to block 916.

At block 918, access to the data memory is performed. Flow then proceeds back to block 902 to begin the next memory access.

At block 916, redirection control logic causes the data access to be redirected. Flow then proceeds back to decision block 904.

At decision block 904, the redirected access will cause flow to proceed to decision block 908 (i.e., because the access is now an instruction memory access).

At decision block 908 a determination is made as to whether the access has been redirected. If not, flow proceeds to block 912. Otherwise, flow proceeds to block 910.

At block 912, an instruction memory access is performed. When complete, flow proceeds back to block 902 to begin the next memory access.

At block 910 the instruction memory access is tagged as a redirected request. This causes the instruction memory interface to redirect the accessed data from the instruction memory, back to the data memory interface. Flow then proceeds to block 912 where the instruction memory access is performed, but upon receipt, the data is provided to the data memory interface. Flow then proceeds back to decision block 904 to await the next memory access.

The above description with reference to FIGS. 5–9 have illustrated alternative embodiments and a method for redirecting data accesses from a data memory to an instruction memory within a split instruction/data memory architecture. Although the present invention and its objects, features, and advantages have been described in detail, other embodiments are encompassed by the invention. In addition to implementations of the invention using hardware, the invention can be embodied in software disposed, for example, in a computer usable (e.g., readable) medium configured to store the software (i.e., computer readable program code and/or data). The software causes the enablement of the functions, fabrication, modeling, simulation and/or testing, of the invention disclosed herein. For example, this can be accomplished through the use of general programming languages (e.g., C, C++, etc.), GDSII, hardware description languages (HDL) including Verilog HDL, VHDL, AHDL (Altera Hardware Description Language) and so on, or other databases, programming and/or circuit (i.e., schematic) capture tools available in the art. The software can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the software can be transmitted over communication networks including the Internet and intranets. It is understood that the functions accomplished and/or structure provided by the invention as described above can be represented in a core that is embodied in software and may be transformed to hardware as part of the production of integrated circuits. Also, the invention may be embodied as a combination of hardware and software.

Moreover, although the present invention has been described with reference to a method, and two alternative embodiments, other implementations may used without departing from the scope of the invention. For example, once the redirection signal has been sent to the data memory interface, the embodiments describe that notice of the redirection signal is provided to the instruction memory interface. It should be appreciated that the actual redirection signal that is sent to the data memory interface may be provided directly to the instruction memory interface, rather than notice. In addition, while the inventors believe that the redirection signal is the fastest way to communicate that redirection should occur, it is envisioned that alternative direction may be provided to either or both of the instruction and data memory interfaces. For example, where multiple data accesses to each interface are allowed, a register, or set of registers may be associated with each access, into which a value may be set or cleared. This value can provide the necessary indication to the interfaces that redirection must occur for a particular pending access. Thus, the type of noticing structure, and/or the logic used to determining redirection should not be limited to the described embodiments.

For details of a particular implementation of the present invention, reference is made to Appendix A (attached hereto) which provides detailed signal descriptions of a split instruction/data memory architecture within a processing system designed by MIPS Technologies, Inc.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A memory interface comprising:
an instruction memory interface for performing instruction retrieval from an instruction memory;
a data memory interface, coupled to said instruction memory interface, for performing data retrieval from a data memory; and
a redirect signal, received by said data memory interface when a data retrieval operation is requested by said data memory interface, but said data retrieval operation requests data within said instruction memory;
wherein notice of receipt of said redirect signal is transmitted from said data memory interface to said instruction memory interface, thereby causing said instruction memory interface to perform said data retrieval operation on said instruction memory.

2. The memory interface as recited in claim 1 further comprising:
a dual memory interface, coupled to both said instruction memory and said data memory, for communicating with both said instruction memory interface and said data memory interface and to provide, upon request, instructions and data to said instruction memory interface and said data memory interface, respectively.

3. The memory interface as recited in claim 2 wherein said dual memory interface further comprises redirection control logic, for determining when said data retrieval operation, requested by said data memory interface, should be performed within said instruction memory.

4. The memory interface as recited in claim 3 wherein said redirection control logic determines when said data retrieval operation should be performed within said instruction memory utilizing a retrieval address provided by said data memory interface.

5. The memory interface as recited in claim 4 wherein when said retrieval address corresponds to a memory address within said instruction memory, said redirection control logic generates said redirect signal to said data memory interface.

6. The memory interface as recited in claim 1 wherein said redirection control logic further comprises:
   i-space logic, for storing a plurality of addresses corresponding to a plurality of address ranges for instructions stored in said instruction memory; and
   d-space logic, for storing a plurality of addresses corresponding to a plurality of address ranges for data stored in said data memory.

7. The memory interface as recited in claim 1 wherein said instruction memory interface further comprises redirect logic for receiving a first address corresponding to an instruction retrieval operation, and a second address corresponding to a data retrieval operation, and for selecting between said first address and said second address utilizing said notice of receipt of said redirect signal sent by said data memory interface.

8. The memory interface as recited in claim 1 wherein when said instruction memory interface performs said data retrieval operation on said instruction memory, said data that is retrieved from said instruction memory is provided by said instruction memory interface to said data memory interface.

9. The memory interface as recited in claim 1 wherein said data memory interface comprises data address logic, for storing a data address that is provided to said instruction memory interface when said redirect signal is received by said data memory interface.

10. A bus interface within a pipelined processing system, the processing system having at least first and second pipeline stages, the bus interface allowing concurrent retrieval of an instruction from an instruction memory, and data from a data memory, comprising:
    a first memory interface coupled to the first stage of the processing system, for retrieving the instruction from the instruction memory;
    a second memory interface coupled to the second stage of the processing system, for retrieving the data from the data memory; and
    redirection logic, coupled to the data memory, for determining when said second memory interface requests data from the data memory that does not reside within the data memory, but instead resides within the instruction memory.

11. The bus interface as recited in claim 10 wherein the first and second pipeline stages within the pipelined processing system are two of a plurality of pipeline stages, and wherein the designation of "first" to the first pipeline stage, and "second" to the second pipeline stage does not imply any particular order of the first and second pipeline stages within the plurality.

12. The bus interface as recited in claim 10 wherein the concurrent retrieval of the instruction from the instruction memory, and the data from the data memory can occur within the same bus cycle.

13. The bus interface as recited in claim 10 wherein said first stage of the processing system is an instruction fetch stage.

14. The bus interface as recited in claim 10 wherein the second stage of the processing system is memory stage for storing/retrieving data to/from the data memory.

15. The bus interface as recited in claim 10 wherein the data retrieved from the data memory is retrieved into a register file within the processing system.

16. The bus interface as recited in claim 10 wherein said first memory interface comprises a redirection mux for selecting between an instruction address for the instruction, and a data address for data to be retrieved from the instruction memory.

17. The bus interface as recited in claim 10 wherein said redirection mux makes a selection based on a redirection signal generated by said redirection logic.

18. The bus interface as recited in claim 10 wherein the second memory interface comprises a data/instruction mux for selecting whether data retrieved from either the data memory, or the instruction memory is to be provided to the processing system.

19. The bus interface as recited in claim 18 wherein the data retrieved from the instruction memory is provided to a register file within the processing system.

20. The bus interface as recited in claim 10 wherein said redirection logic, upon determining when said second memory interface requests data from the data memory that resides within the instruction memory, transmits a redirection signal to said second memory interface.

21. The bus interface as recited in claim 20 wherein said second memory interface, upon receipt of said redirection signal from said redirection logic, provides notice of receipt of said redirection signal to said first memory interface.

22. The bus interface as recited in claim 20 wherein said first memory interface, upon receipt of said notice, retrieves said data from the instruction memory and provides said data to said second memory interface.

23. The bus interface as recited in claim 10 wherein said redirection logic comprises:
    I space logic, for storing instruction address information pertaining to instructions that are stored within the instruction memory;
    D space logic, for storing data address information pertaining to data that is stored in the data memory; and
    Redirection control logic, coupled to both said I space logic and said D space logic, for determining whether data requested by said second memory interface resides within the instruction memory or the data memory.

24. The bus interface as recited in claim 23 wherein said determining is based on comparing an address corresponding to said data requested by said second memory interface to said instruction address information and said data address information.

25. The bus interface as recited in claim 10 wherein said second memory interface comprises:
    instruction type redirection logic, for receiving an instruction type signal, specifying the type of instruction that is executing, and for redirecting a data request to said first memory interface if the type of instruction that is executing meets predefined criteria.

26. The bus interface as recited in claim 25 wherein an instruction that meets said predefined criteria is a PC relative load instruction.

27. The bus interface as recited in claim 26 wherein said PC relative load instruction loads data into a register file from the instruction memory within the second pipeline stage of the pipelined processing system.

28. A method for redirecting a memory request from a data memory interface to an instruction memory interface, comprising:
    determining whether a request by a data memory interface corresponds to data residing within a data memory or an instruction memory;
    if said determining determines that the request by the data memory interface corresponds to data residing within the instruction memory, redirecting the request to an instruction memory interface.

29. The method as recited in claim 28 wherein said redirecting comprises:
deciding whether data corresponding to the request is located within the instruction memory or the data memory; and
if said step of deciding determines that the data corresponding to the request is located within the instruction memory, generating a redirect signal to the data memory interface.

30. The method as recited in claim 29 wherein upon receipt of the redirect signal by the data memory interface, the data memory interface directs the instruction memory interface to retrieve the requested data from the instruction memory.

31. The method as recited in claim 30 wherein upon receipt of the requested data from the instruction memory, the instruction memory provides the requested data to the data memory interface.

32. The method as recited in claim 28 further comprising:
determining, by the data memory interface, whether the request by the data memory interface corresponds to a type of instruction that retrieves data from the instruction memory, and if so;
redirecting the request to the instruction memory interface.

33. A computer program product for use with a computing device, the computer program product comprising:
a computer usable medium, having computer readable program code embodied in said medium, for causing a processing system to be described, said computer readable program code comprising:
first program code for providing an instruction memory interface for reading instructions from an instruction memory;
second program code for providing a data memory interface for reading data from a data memory; and
third program code for providing redirection control coupled to said data memory interface;
wherein said redirection control determines whether data requested by said data memory interface resides within said instruction memory; and
wherein if said redirection control determines that said data requested by said data memory interface resides within said instruction memory, said redirection control causes said data memory interface to direct said instruction memory interface to request said data from said instruction memory.

34. The computer program product as recited in claim 33 wherein after said instruction memory interface receives said data from said instruction memory, it passes said data to said data memory interface.

35. The computer program product as recited in claim 33 further comprising:
third program code for providing instruction type redirection logic within said data memory interface to redirect a data request by said data memory interface to said instruction memory interface based on the type of instruction that is executing.

36. The computer program product as recited in claim 33 further comprising:
fourth program code for providing redirection logic, external to said instruction memory interface and said data memory interface, for determining whether a request by the data memory interface has requested data that resides in said instruction memory; and
fifth program code for causing a redirection signal to be sent from said redirection logic to said data memory interface, thereby notifying said data memory interface to redirect said request to said instruction memory interface.

37. The computer program product as recited in claim 33 wherein said program code is hardware description language.

38. A computer data signal embodied in a computer usable medium comprising:
computer-readable program code for providing a split instruction/data bus interface for concurrently retrieving instructions from an instruction memory, and data from a data memory, said program code comprising:
first program code for providing an instruction bus interface for retrieving instructions from the instruction memory;
second program code for providing a data bus interface for retrieving data from the data memory; and
third program code for providing logic to determine whether data requested by said data bus interface resides within the instruction memory; and
fourth program code for generating a signal from said logic to cause said instruction bus interface to retrieve said data from the instruction memory.

39. The computer data signal as recited in claim 38 wherein said signal is first provided to said data bus interface.

40. The computer data signal as recited in claim 39 further comprising:
fifth program code for providing data redirection logic to redirect data retrieved by said instruction bus interface to said data bus interface.

41. The computer data signal as recited in claim 38 wherein said program code is hardware description language.

42. A processing system having a processor with a plurality of processing stages, at least two of the processing stages for communicating with associated first and second memories, the processing system comprising:
a first memory interface for communicating between a first one of the at least two processing stages and the first memory;
a second memory interface, coupled to said first memory interface, for communicating between a second one of the at least two processing stages and the second memory; and
redirection logic, coupled to said second memory interface, for directing said first memory interface to communicate with the first memory on behalf of the second one of the at least two processing stages.

43. The processing system as recited in claim 42 wherein said first memory interface performs instruction retrieval from an instruction memory.

44. The processing system as recited in claim 42 wherein said second memory interface performs data retrieval from a data memory.

45. The processing system as recited in claim 42 wherein communication between said second one of the at least two processing stages and the second memory comprises reading and writing data from and to the second memory.

* * * * *